United States Patent [19]

Perine et al.

[11] 4,316,922

[45] Feb. 23, 1982

[54] AQUEOUS EPOXY PHOSPHATE DISPERSIONS COMPRISING N-BUTANOL, N-HEXANOL AND ETHYLENE GLYCOL MONOBUTYL ETHER

[75] Inventors: Donald R. Perine, Missouri City; Peter A. Lucas, Richwood, both of Tex.

[73] Assignee: The Dow Chemical Company, Midland, Mich.

[21] Appl. No.: 200,223

[22] Filed: Oct. 23, 1980

[51] Int. Cl.$^3$ .................. C08L 63/00; C08K 5/05; C08K 5/06; B65D 23/02

[52] U.S. Cl. ............... 428/35; 260/29.2 EP; 260/29.4 R; 428/418

[58] Field of Search ............... 260/29.2 EP, 29.4 R; 428/418, 35

[56] References Cited

U.S. PATENT DOCUMENTS

| | | | |
|---|---|---|---|
| 3,446,764 | 5/1969 | Phillips et al. | 260/29.2 EP |
| 3,937,679 | 2/1976 | Bosso et al. | 260/29.2 EP |
| 3,962,499 | 6/1976 | Brody et al. | 260/29.2 EP |
| 4,026,857 | 5/1977 | Brown et al. | 260/29.2 EP |
| 4,104,224 | 8/1978 | Nelson et al. | 260/29.4 R |
| 4,125,499 | 11/1978 | Howard | 260/29.2 EP |
| 4,141,871 | 2/1979 | Shimp et al. | 428/418 |
| 4,145,324 | 3/1979 | Chen | 260/29.4 R |
| 4,164,487 | 8/1979 | Martin | 260/29.2 EP |
| 4,233,197 | 11/1980 | Howell | 428/418 |

FOREIGN PATENT DOCUMENTS 55-3463  1/1980  Japan ................... 523/416

*Primary Examiner*—Herbert J. Lilling
*Attorney, Agent, or Firm*—R. R. Stringham

[57] ABSTRACT

The combination of n-butanol, n-hexanol and butoxyethanol, is a superior formulation solvent for aqueous dispersions of amine-neutralized, phosphorylated DGEBA-type epoxy resins which are to be applied to container interiors by spraying. Good film rheology and control of viscosity—by adjusting the solvent to organic solids ratio—is attained at total solids content as low as 20 wt. % and at VOC's as low as 3.5 lbs. per gallon.

10 Claims, No Drawings

AQUEOUS EPOXY PHOSPHATE DISPERSIONS COMPRISING N-BUTANOL, N-HEXANOL AND ETHYLENE GLYCOL MONOBUTYL ETHER

BACKGROUND OF THE INVENTION

Water-thinnable, base-neutralized reaction products of phosphoric acid and DGEBA (diglycidyl ether/bisphenol-A) type epoxy resins are disclosed in U.S. Pat. No. 4,164,487, the disclosure of which is incorporated herein by reference. These products have utility in water-borne coatings systems. They are unique in being capable of existing as aqueous dispersions comprising no organic solvents. However, for spray application to can interiors—a very exacting application—the inclusion of a minor proportion of organic solvents, such as glycol monoethers, is considered essential.

A solvent mixture which has been found suitable for this purpose is a 50/50 (by weight) mixture of the mono-hexyl and mono-butyl ethers of ethylene glycol. However, the hexyl ether ("hexyl cellosolve") has a sufficiently high boiling point (208° C.) so that it is difficult to attain complete removal of it from the coating (film) without resorting to excessively long curing times. Also, the latter solvent is expensive.

OBJECTS OF THE INVENTION

An important object of the invention is to provide a solvent for amine-neutralized, phosphorylated, DGEBA-type epoxy resins which has a boiling point below 200° C. and is otherwise of a nature such that aqueous dispersions of such resins, containing minor amounts of that solvent, are suitable for spray coating of can interiors.

A major object is to maintain viscosity control at relatively low solids contents while maintaining proper film rheology during the cure process.

A further ojbect is to attain improved film coverage by aqueous coating systems of the foregoing type.

Another object is to provide a formulation solvent of such a nature that the aqueous coating compositions comprising it retain their essential film-forming characteristics for at least 30 days at a temperature of 120° F.

An additional object is to provide a more economic aqueous coating system.

Still other objects will be made apparent, to those knowledgeable in the art, by the following specification and claims.

SUMMARY OF THE INVENTION

The present invention is based on the discovery that the foregoing objects can be attained by incorporating a ternary mixture of n-butanol, n-hexanol and butoxyethanol (ethylene glycol monobutyl ether) as the formulation solvent in aqueous dispersions of amine-neutralized, phosphorylated DGEBA-type epoxy resins.

The process by which the final aqueous coating systems comprising the recited solvents are formed is also within the ambit of the invention.

The composition of the invention may be more precisely defined as an aqueous coating composition, exclusive of catalysts and curing agents, comprising:

(1) a phosphorylated epoxide resin preparable by the reaction of a DGEBA-type polyether, polyol epoxide with orthophosphoric acid and water and containing phosphomonoester (—O—PO(OH)$_2$) groups;

(2) at least enough of a tertiary aliphatic amine to render said resin water-dispersible, by salification of said phosphomonoester groups, (3) water, and, (4) n-butanol, n-hexanol and butoxyethanol, in the proportions of from about 10 to about 30 parts of n-butanol and from about 40 to about 20 parts of n-hexanol per 50 parts by weight of the butoxyethanol, the total content of the three solvents in the composition being such that the VOC content thereof is less than 4 pounds per gallon.

Preferably, the phosphorylated resins is deriveable from a DGEBA-type epoxide, such as DER-667 epoxy resin (Dow), for example, having an EEW of from about 1600 to about 2000 and constitutes from about 20 to about 25 wt. % of the composition. The preferred amine is N,N-dimethyl-ethanolamine. For spray application, the preferred total solvents to organic solids ratio is from about 0.5 to about 0.9 by weight.

Definitions

As used herein, the term "tertiary aliphatic amine" is intended to include those in which from one to three of the aliphatic groups attached to the nitrogen are 2-hydroxyalkyl groups. The term "phosphorylated resin" is not intended to exclude the presence therein o 1,2-glycol groups (formed primarily by hydrolysis of phosphodiester groups). The term "DGEBA-type resin" is intended to include diepoxides of the general type produced by co-reaction of bisphenols (such as "Bis-A" and "Bis-F", for example) with diglycidyl ethers of bisphenols and having EEW's of from about 200 up to about 5500. The term VOC means Volatile Organic Compounds; proposed by the EPA to be limited to a maximum of 4.2 lbs. per gallon for container coatings.

DETAILED DESCRIPTION

The epoxide phosphorylation/hydrolysis may be carried out with 85% aqueous H$_3$PO$_4$, essentially as described in the aforesaid '487 patent. The DGEBA-type resin is dissolved in a solvent, such as a 22/78 weight ratio mixture of CH$_2$Cl$_2$/acetone and contacted for several hours, at a temperature of about 115° C., with an amount of the acid such as to provide from about 0.3 to about 0.5 P—OH groups per oxirane group. The reaction mixture is essentially neutralized with an amine, diluted with water and stripped to remove the solvents and any undesirable excess of free amine present. A water-thinnable, aqueous dispersion suitable for formulation by the method of the present invention, results. A solids content of 50 weight percent is typically attainable.

Conversion of the stripped dispersion to the final coating composition requires the addition of the formulation solvents, more water and a compatible curing agent, such as CYMEL 303 curing agent (American Cyanamid Company), for example. It is generally desirable to maintain a pH on the basic side (usually about 9). If the amount of amine present does not suffice for this, or for other purposes, more of the same amine, or a different amine, may be added.

To obtain a uniform coating on a can interior by spraying, it is necessary that the sprayed formulation have a relatively high viscosity. Because the formulation must be sprayable in the first place, the requisite viscosity cannot be achieved simply by formulating at a high solids content or by forming the dispersed product particles from such high molecular weight resins or under such conditions that a relatively large particles size results.

To do the necessary job, the formulation solvent must be capable of interacting effectively with both the aqueous phase and the particles. The long hydrocarbon "tail" on the ethylene glycol monohexyl ether apparently enters and swells the dispersed particles quite effectively but the molecule as a whole has such a low solubility (about 1 percent) in water that its polar (hydroxyl-containing) "head" does not adequately extend out into the water phase. On the other hand, the corresponding butyl ether swells the particles less effectively but is water-miscible. By using a mixture of these two ethers, both particle-swelling and particle "linking" (by interaction of the hydroxyethoxy groups at the particle surfaces and the water layers surrounding the particle) result and the viscosity of the dispersion is effectively increased without rendering it incapable of passing through a spray head.

Attempts to replace the hexyl ether or the mixed ethers, with a variety of single solvents failed. Surprisingly, however, it was found that the role of the ether mixture could be played, and even improved on, by the combination of n-butanol and n-hexanol with the butyl ether.

The parts by weight of the butoxyethanol must, at least for dispersions of (salified) phosphate resins derived (or deriveable) from DER-667, be kept essentially equal to the total parts by weight of the two alcohols, to ensure good film continuity. The butanol/hexanol ratio is preferably about 25/25 but can vary from about 10/40 to about 30/20.

The actual viscosity of the final dispersion depends both on the organic solvent to organic solids ratio therein and the content (concentration) of free amine. If the latter factor is held constant, the viscosity can be adjusted up or down, without adverse effect, by increasing or decreasing the solvent to solids ratio (within the range of from about 0.5 to about 0.9). However, the converse is generally not true. The free amine content should be held essentially at a level such that the sum of the free amine and that present as amine-salified P—OH groups is about 2 parts per hundred parts of the resin (a level which results in a pH of about 9 for the overall formulation). Thus, at a 25% solids content, the Zahn (#2 cup) viscosity of a typical dispersion derived from DER-667, employing N,N-dimethyl ethanolamine, varies exponentially from about 26 seconds, at a solvent to organic solids ratio of about 0.725, to about 90 seconds, at a solvent to solids ratio of about 0.825. For a 23% solids formulation of the same phosphate resin, the viscosity varies less dramatically, i.e., from about 26 seconds at a solent/solids ratio of about 0.84 to about 30 seconds at a ratio of about 0.9.

The relationship of viscosity to solvent/solid ratio will be somewhat different for dispersions prepared from different starting resins and/or at different P—OH to oxirane ratios (which ordinarily are kept as low as possible to minimize the content of free $H_3PO_4$ in the phosphorylation product). However, this relationship is readily determined by methods familiar to those skilled in the art.

The optimum viscosity for a given application or a particular spray system can also be determined easily by well known methods. For dispersions prepared (or preparable from) DER-667 with about 1 part $H_3PO_4$ perhundred parts of the epoxy resin, a viscosity range of about 23-26 seconds (Zahn, #2 cup; equivalent to about 60-75 cps) is essential to sprayability.

The manner in which the initial dispersion, the formulation solvent, the curing agent (such as a cross-linking resin) the additional water and the added amine are brought together in the final formulation is important.

The preferred procedure is to combine the salified phosphorylation product dispersion with about 35 parts of butoxyethanol, about 18 parts of n-butanol, enough additional dimethyl ethanolamine to make a total of about 1 part thereof and enough water to make a total of about 130 parts, per 100 parts of the resin. The resulting dispersion contains about 35% solids. This is then thinned to the desired solids level and combined with the curing agent in the following manner. About 85% of the additional water required is gradually introduced to the dispersion with stirring. The pH is checked and adjusted with a little amine (or NH4OH), if necessary, to the basic side. Next, the curing agent is mixed with the hexanol and the rest of the butanol and butoxyethanol and the resulting solution added slowly, with agitation, to the dispersion. The additional amine (over the amount required for resin salification) is mixed with the remaining 15% of the required water and the resulting solution added over a 5 to 10 minute period.

The resulting formulation is allowed to stabilize over a 24 to 48 hour period (the viscosity drops from an initial value which is generally higher than the desired final value). The viscosity is then checked and raised, if necessary, by adding more butanol/hexanol/butoxyethanol, in appropriate amounts to maintain the selected ratios of the solvents to one another.

Optionally, the foregoing procedure can be modified by leaving out the butanol in the initial dispersion-thinning step. That is, the entire amount of butanol is introduced subsequently in the curing agent solution. Otherwise, however, said procedure should be adhered to if consistently good results are to be attained.

The following examples are for purposes of illustration and are not to be construed as limiting the present invention in a manner inconsistent with the claims appended to this specification.

EXAMPLES

1. Comparison of Various Formulation Solvents

After screening some sixteen solvents as canidates to replace hexyl cellosolve (or the combination of hexyl cellosolve (HC) and butoxyethanol (BE)), a comparison of the latter solvent pair (in the 20/80 wt. ratio usually employed) witn n-butanol (BuOH), n-hexanol (HexOH) and butoxyethanol (BE), individually or in several combinations, was made. The same phosphorylated DER-667 resin (neutralized with about 1.2 parts of dimethyl ethanolamine per 100 parts resin) dispersion was used for each formulation. The same curing agent (CYMEL 303) was used in the same amount and the formulations were otherwise essentially identical except for the solvents used. The results are summarized in Table 1 below:

TABLE 1
COMPARISON OF FORMULATION SOLVENTS

| Solvent | % N.V.[1] | Organic[2] Solvents | Os/Osd[3] | VOC (Lbs/Gal) | VIS[4] (Sec) | Draw Down[5] Appearance |
|---|---|---|---|---|---|---|
| BE/HC 20:80 | 25 | 18 | 0.54 | 3.1 | 26 | 9 |
| BE 100 | 25 | 23 | 0.70 | 3.24 | 16 | 4 |
| BE/HexOH 50:50 | 25 | 23 | 0.70 | 3.50 | 38 | 8 |
| BE/BuOH 50:50 | 25 | 23 | 0.70 | 3.48 | 18 | 7 |
| HexOH/BuOH 50:50 | 25 | 23 | 0.70 | 3.54 | 20 | 0 |
| BE/BuOH/HexOH 50:25:25 | 25 | 23 | 0.70 | 3.50 | 32 | 9 |

[1] Wt. % non-volatiles.
[2] Wt. %.
[3] Wt. ratio organic solvents to organic solids.
[4] All viscosities are at room temperature and in a #2 Zahn cup.
[5] The appearance is based on a subjective scale from 0–10 for the film flow and coverage of the cured film when draw down on tin-free steel using a #12 rod, and cured for 2' @ 400° F.

When a can interior was spray-coated with the binary BE/hexanol formulation and the cured coating checked with a Waco enamel tester (which measures electrical current flow through the coated can wall to an electrode) poor coverage by the film was indicated. Blistering and pin holes were evident. In contrast, the Waco readings of both the BE/HC and the ternary formulations were well below 25 milliamperes (which is considered good).

2. Preferred Formulation of a Sprayable Coating Derived from DER-667

A 33% non-volatiles dispersion of a neutralized reaction product of DER-667, $H_3PO_4$ (1 part per hundred of the resin) and water (1 mole per mole of $H_3PO_4$) is prepared. The composition of the dispersion (total weight 3041.8 grams) is: phosphorylation product, 1003.8 grams; water, 1499 grams; DOWANOL EB (butoxy-ethanol) (Dow), 351.3 grams; n-butanol, 175.7 grams and dimethyl ethanolamine, 12.0 grams. About 1200 grams of deionized water is stirred into the dispersion; the pH is checked and found greater than 7. 303 Grams of CYMEL 303 (a melamine cross-linking resin) is dissolved in a mixture of 132.7 grams of DOWANOL EB, 66.3 grams of n-butanol and 242.0 grams of n-hexanol. The resulting solution is stirred into the dispersion. 8.1 Grams of dimethyl ethanolamine is dissolved in 212.9 grams of deionized water and the resulting solution stirred into the dispersion.

The final solids content of the formulation is 22wt. %, the pH is 9.3, the ratio of solvents to organic solids is 0.88 and the Zahn (#2 cup) viscosity (after stabilization) is 24 seconds.

Can interiors are sprayed (fluid temperature 125° F.) with the foregoing formulation in amounts to yield cure film weights of 120 and 180 milligrams per can. The coatings arre oven-cured for two minutes at 400° F. and are then evaluated. Replicate cured coatings reproducibly pass the standard boiling water adhesion and blush test and give Waco readings as follows: 120 mg film wt., 5–10 ma, 180 mg, 4–8 ma.

What is claimed is:

1. An aqueous coating composition, exclusive of catalysts and curing agents, comprising:
   (1) a phosphorylated epoxide reins preparable by the reaction of a DGEBA-type polyether, polyol epoxide with orthophosphoric acid and water and containing phosphomonoester ($—O—PO(OH)_2$) groups;
   (2) at least enough of a teritary aliphatic amine to render said resin water-dispersible, by salification of said ester groups,
   (3) water, and,
   (4) n-butanol, n-hexanol and butoxyethanol, in the proportions of from about 10 to about 30 parts of the butanol and from about 40 to about 20 parts of the hexanol per 50 parts by weight of the butoxyethanol.

2. The composition of claim 1 wherein said epoxide has an EEW of from about 1600 to about 2000.

3. The composition of claim 1 wherein said amine is N,N-dimethyl ethanolmaine.

4. The composition of claim 2 wherein said amine is N,N-dimethyl ethanolamine and is present in excess of the amount required to render said resin water-dispersible.

5. The composition of claim 4 wherein the total amount of said amine present therein is about 2 parts per 100 parts of said resin, by weight and the pH of the composition is about 9.

6. The composition of claim 4 wherein the relative amounts of weight of the butanol, hexanol and butoxyethanol are 25, 25 and 50, respectively.

7. The composition of claim 5 additionally comprising a cross-linking resin, the weight ratio of the butanol, hexanol and butoxyethanol to the organic solids present in the coating composition being from about 0.5 to about 0.9.

8. The composition of claim 7 wherein the relative amounts by weight of the butanol, hexanol and butoxyethanol are 25, 25 and 50, respectively, and the weight ratio of the latter solvents to the organic solids present is such that the viscosity of the composition, as measured with a #2 cup in a Zahn apparatus, is from about 22 to about 26 seconds.

9. The composition of claim 7, in the form of a film on the interior surfaces of a can.

10. The method of preparing the composition of claim 7 comprising:
   a. providing an aqueous dispersion of the salified, phosphorylated resin containing butoxyethanol and n-butanol and having a solids content of from about 33 to about 35 wt. percent,
   b. thinning the dispersion with water,
   c. adding a solution of said cross-linking resin in n-butanol, n-hexanol and butoxyethanol to the water-thinned dispersion,
   and
   d. adding a solution in water of an amount of N,N-dimethyl ethanolamine such that the total content of the latter amine in the composition is about 2 parts per hundred parts by weight of the phosphorylated resin.

* * * * *